United States Patent [19]

Davey

[11] 4,097,257
[45] Jun. 27, 1978

[54] GLASS MOLDING PROCESS WITH MOLD LUBRICATION

[75] Inventor: Richard G. Davey, Toledo, Ohio

[73] Assignee: Owens-Illinois, Inc., Toledo, Ohio

[21] Appl. No.: 731,591

[22] Filed: Oct. 12, 1976

Related U.S. Application Data

[63] Continuation of Ser. No. 563,895, Mar. 31, 1975, abandoned.

[51] Int. Cl.² .............................................. C03B 39/00
[52] U.S. Cl. ............................................ 65/26; 65/24; 252/22
[58] Field of Search ....................... 65/24, 26, 169, 170; 252/12.2, 22, 29

[56] References Cited

U.S. PATENT DOCUMENTS 2,587,722  3/1952  Garratt et al. ................. 65/26 X
3,874,862  4/1975  Bickling et al. ................. 252/29

*Primary Examiner*—Arthur D. Kellogg
*Attorney, Agent, or Firm*—Howard G. Bruss, Jr.; M. E. Click; D. H. Wilson

[57] ABSTRACT

Improvements are provided in glass forming processes of the type wherein hot metal blank molds are employed by using the complementary action of a solid film lubricant layer, of graphite dispersed in a cured thermoset organopolysiloxane, along with an overspray of a lubricating oil.

5 Claims, No Drawings

GLASS MOLDING PROCESS WITH MOLD LUBRICATION

This is a continuation of application Ser. No. 563,895, filed Mar. 31, 1975, now abandoned.

THE INVENTION

The present invention is directed to the art of glass manufacturing and, more particularly, is directed to an improvement in the art of glass manufacturing wherein hot metal molds are employed in a process for forming glass, wherein formable glass is first formed into a blank, or parison, in a blank, or parison, mold and then the blank, or parison, is subsequently converted into a final glass article in a blow mold and wherein the process proceeds without any relative rotation of the glass and the respective molds.

In the past it has been common practice in forming glass articles by the process indicated above to swab the blank mold in order to provide needed characteristics to the hot metal mold so as to form the desired glass articles. Because of the recognized undesirability of this swabbing operation there has recently been developed a process wherein the blank mold is coated, or provided, with a solid film lubricant layer which defines the glass-forming or glass-contacting, cavity-defining surface of the blank mold and wherein the layer is a dispersion of non-colloidal graphite in a thermoset cured organopolysiloxane binder and where the binder can include residuals from other materials that may have been employed such as cure promoters for the organopolysiloxane resin, for example, melamine formaldehyde partial condensate resins, including alkylated melamine formaldehyde partial condensate resins. The provision of this solid film lubricant layer satisfies some of the needs in the art and provides the blank, or parison, mold with needed operational characteristics to provide improved efficiencies in glass formation at higher quality and at lower cost. For further particulars with regard to such a solid film lubricant layer reference may be had to copending application U.S. Ser. No. 562,554, now abandoned, which is hereby incorporated by reference. In spite of many of the outstanding characteristics of the use of such a glass-forming, cavity-defining solid film lubricant layer on the blank mold there nonetheless still exists a need in the art for even longer mold lives so as to improve the production efficiency and quality of the ultimate glass container or glass article.

Thus, in accordance with this invention there is provided an improvement in methods for forming glass articles which comprise forming formable glass into a parison, or blank, by contact with a glass-forming, cavity-defining surface of a blank, or parison, mold and subsequently forming said parison into the final glass article by contact with a glass-forming, cavity-defining surface of a blow mold and wherein the forming of said parison and said forming of said final article is done without relative rotation of the respective molds and the glass and wherein said glass-forming, cavity-defining surface of the blank mold is a solid film lubricant layer of graphite dispersed in a thermoset cured organopolysiloxane binder; the improvement resides in increasing the effective glass forming life of the blank mold, and more specifically the organopolysiloxane-graphite solid film lubricant layer, by applying onto the solid film lubricant layer, prior to formation of the blank, or parison, an effective lubricating amount of a lubricating oil.

Czechoslovakian Pat. No. 128,236 discloses colloidal graphite in an organopolysiloxane as a lubricant for glass molds but does not describe techniques for increasing the effective glass forming lives of a solid layer as contemplated herein. U.S. Pat. No. 2,573,337 is directed to a paste mold forming operation that is, an operation which there is relative rotation of the glass and mold and wherein the paste used on the paste mold is an organopolysiloxane. This patent likewise does not describe the improved method of the present invention. U.S. Pat. No. 3,347,650 is directed towards lubricant coatings but similarly does not recognize the present contribution of increasing the effective glass forming life of the graphite-organopolysiloxane layer.

As indicated above in the hot metal mold glass forming process a graphite-organopolysiloxane solid film lubricant is provided on the blank mold so as to be the glass-forming, cavity-defining surface of the blank mold. In order to increase the effective glass forming life quite significantly all that is required is that effective lubricating amounts of a lubricating oil be applied to the solid film lubricant layer, for example, by spraying, prior to the formable glass being discharged into the blank mold. The complementary action of the oil and the graphite-organopolysiloxane layer produces outstanding mold lives. This spraying can be done, for example, using any of the spray materials and apparatus set forth in U.S. Pat. Nos. 3,623,856; 3,141,752; 3,814,594; and 3,721,542 all of which are hereby incorporated by reference.

The amount of the lubricating oil is not critical and will be routinely adjusted by those skilled in the art. Exemplary of the lubricating oils that may be employed are the water base and oil base lubricants. Additionally, if desired, the water base and oil base materials may have incorporated therein effective lubricating amounts of colloidal graphite to enhance the operational characteristics. Usually the amount of colloidal graphite will be quite small and typically will be on the order of about 1 or 2% by weight of the spraying material. The oil, as generally indicated above, can be what is termed in the art water-soluble oils or they can be cutting oils which are typically emulsions of lubricating oils in water or they can be conventional lubricating oils. Exemplary of oils which may be employed are the silicone oils as well as the mineral oils with mineral oils being preferred. Especially highly preferred mineral oils are those having an API gravity (ASTM-D-287) in the range of 20 to about 30 and a viscosity (ASTM-D-88) of between about 60 or 70 SUS to about 110 SUS at about 100° F. These oils are well known in the art and are widely available from the various petroleum companies such as, for example, Mobil Oil Co. and Shell Oil Co. As indicated above, the spray material can include effective lubricating amounts of colloidal graphite. These colloidal graphite materials are likewise widely available as dispersions and one especially suitable material is that manufactured by the Acheson Colloids Company as their Oil-Dag which is a dispersion of about 10% by weight colloidal graphite in mineral oil. The amounts of the respective materials will be routinely selected by those skilled in the art the only consideration being that they be of a sprayable viscosity in order to allow their easy application. Excellent results will be obtained by combining about 1 ounce to about 20 ounces of the above type colloidal graphite with about 5 gallons of lubricating oil, preferably mineral oil. The concentration of graphite in the sprayable mixture resulting from the mixing of 5 gallons of lubricating oil with the above described concentrate of 10% by weight of graphite in oil is as follows: One ounce of the 10% concentrate mixed with 5 gallons of lubricating oil forms a sprayable mixture containing about 0.34% by weight of graphite; and 20 ounces of the 10% concentrate mixed with 5 gallons of lubricating oil forms a sprayable mixture containing about 6.8% by weight of graphite.

In order to illustrate the outstanding and surprising advantages of the present invention a conventional IS machine was operated in which the parison was formed in a blank mold having a glass-forming, cavity-defining surface of a solid film lubricant layer, of graphite dispersed in a cured thermoset organopolysiloxane binder, without relative rotation of the glass in the mold and then the parison, or blank, was subsequently formed into a glass bottle in a blow mold, likewise without relative rotation of the blank and the mold. The graphite employed was that commercially supplied by Asbury Graphite Mills, Inc. under their designation A-98 and the organopolysiloxane was a methylphenylsiloxane having a ratio of methyl and phenyl radicals to silicon atoms of about 1.4:1 (generally referred to in the art as an R:Si ratio) and the mole ratio of methyl to phenyl radicals was about 3.3:1, as determined by analysis. The procedure was that set forth in co-pending application Ser. No. 562,554. A run was made wherein the solid firm lubricant layer of the graphite dispersed in the cured organopolysiloxane binder was not sprayed and another run was made with the solid film lubricant being sprayed with a lubricating oil in effective lubricating amounts. The specific material that was employed to spray the solid film lubricant prior to the charge of formable glass being discharged into the blank was prepared by mixing about 6 ounces of Oil-Dag colloidal graphite (a 10% by weight dispersion of colloidal graphite in mineral oil and supplied commercially by the Acheson Colloids Company) in about 5 gallons of mineral oil. About 6 pints of this admixture was employed in a 24 hour period on a 6 section I.S. glass forming machine operating at about 120 bottles per minute. When the forming process was practiced using the complementary action of the solid film lubricant and the oil spray the effective glass forming life of the solid film lubricant layer was increased on the order of about 46 to 47% compared to the run without using the oil spray. Those skilled in the art will readily appreciate the outstanding significance of such an increase in mold life.

In addition to the above solid film lubricant, which is a highly preferred solid film lubricant, other solid film lubricants for blank molds have been recently made available by such companies as Microseal Corporation, or E/M Lubricants Inc., Acheson Colloids Company, Ball Prothers Service Corporation, Dylon Industries Inc., and Compagnie Francaise Des Lubrifiants and Specialty Products Company. All of these solid film lubricants involve the use of a lubricating pigment, e.g. molybdenum and/or graphite dispersed in a hardened binder with the pigments being used in effective lubricating amounts. As with the above described highly preferred solid film lubricant of graphite dispersed in an organopolysiloxane these other solid film lubricants for blank molds may likewise be employed as contemplated herein to increase their effective lives.

As previously indicated those skilled in the art will routinely select the appropriate proportions of materials to be employed as the spraying material as well as the amounts that are to be employed. As will be appreciated the amounts may, of course, vary depending on the type of glass article which is being produced as well as the rates at which it is produced.

I claim:

1. In a method for forming glass articles comprising forming formable glass into a parison by contact with a glass-forming, cavity-defining surface of a blank mold and subsequently forming said parison into said final article by contact with a glass-forming, cavity-defining surface of a blow mold and wherein said forming of said parison and said forming of said final article is done without relative rotation of the respective molds and glass, and wherein said glass-forming, cavity-defining, surface of said blank mold is a solid film lubricant layer of graphite dispersed in a thermoset cured organopolysiloxane binder, the improvement comprising increasing the effective glass forming life of said layer by spraying onto said solid film lubricant layer prior to glass formation effective lubricating amounts of a mixture comprising lubricating oil and effective lubricating amounts of graphite said mixture containing about 0.34% to about 6.8% by weight of said graphite.

2. In a method for forming glass articles comprising forming formable glass into a parison by contact with a glass-forming, cavity-defining surface of a blank mold and subsequently forming said parison into said final article by contact with a glass-forming, cavity-defining surface of a blow mold and wherein said forming of said parison and said forming of said final article is done without relative rotation of the respective molds and glass, and wherein said glass-forming, cavity-defining surface of said blank mold is a solid film lubricant layer of effective lubricating amounts of a lubricating pigment dispersed in a binder therefor, the improvement comprising increasing the effective glass forming life of said layer by spraying onto said solid film lubricant layer prior to glass formation effective lubricating amounts of a mixture comprising lubricating oil and effective lubricating amounts of graphite said mixture containing about 0.34% to about 6.8% by weight of said graphite.

3. The method of claim 1 wherein said mixture contains about 1% to about 2% by weight of graphite.

4. The method of claim 2 wherein said mixture contains about 1% to about 2% by weight of graphite.

5. In a method for forming glass articles comprising forming formable glass into a parison by contact with a glass-forming, cavity-defining surface of a blank mold and subsequently forming said parison into said final article by contact with a glass-forming, cavity-defining surface of a blow mold and wherein said forming of said parison and said forming of said final article is done without relative rotation of the respective molds and glass, and wherein said glass-forming, cavity-defining surface of said blank mold is a solid film lubricant layer of effective lubricating amounts of a lubricating pigment dispersed in a binder therefor, the improvement comprising increasing the effective glass forming life of said layer by spraying onto said solid film lubricant layer prior to glass formation effective lubricating amounts of a mixture comprising lubricating oil and effective lubricating amounts of graphite said mixture containing graphite in the range of proportions formed by mixing from about one ounce to about 20 ounces of a 10% by weight concentrate of colloidal graphite in mineral oil with about 5 gallons of lubricating oil.

* * * * *